US009063670B2

(12) United States Patent
Armstrong

(10) Patent No.: US 9,063,670 B2
(45) Date of Patent: *Jun. 23, 2015

(54) HARD DISK DRIVE WITH INTEGRATED ETHERNET NETWORK INTERFACE

(71) Applicant: Marvell World Trade LTD., St. Michael (BB)

(72) Inventor: Alan Armstrong, Los Altos, CA (US)

(73) Assignee: Marvell World Trade LTD., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/101,687

(22) Filed: Dec. 10, 2013

(65) Prior Publication Data
US 2014/0101348 A1 Apr. 10, 2014

Related U.S. Application Data

(63) Continuation of application No. 13/681,885, filed on Nov. 20, 2012, now Pat. No. 8,606,978, which is a continuation of application No. 13/447,486, filed on Apr. 16, 2012, now Pat. No. 8,316,167, which is a
(Continued)

(51) Int. Cl.
*G06F 13/12* (2006.01)
*G06F 3/06* (2006.01)
*G06F 12/00* (2006.01)

(52) U.S. Cl.
CPC ............ *G06F 3/0674* (2013.01); *G06F 3/0607* (2013.01); *G06F 3/0626* (2013.01); *G06F 3/0661* (2013.01); *G06F 3/0676* (2013.01);
(Continued)

(58) Field of Classification Search
None
See application file for complete search history.

(56) References Cited

U.S. PATENT DOCUMENTS 7,627,398 B1 12/2009 Bennett et al.
7,676,733 B2 3/2010 Ganga et al.
(Continued)

FOREIGN PATENT DOCUMENTS

EP 1355229 A2 10/2003
JP 2003515967 A 5/2003
(Continued)

OTHER PUBLICATIONS

Final Office Action issued Sep. 27, 2011, in corresponding Japanese Patent Application No. 2008-558368.
(Continued)

*Primary Examiner* — Idriss N Alrobaye
*Assistant Examiner* — David Martinez

(57) ABSTRACT

A system including an Ethernet network interface module, a processor, and a hard disk control module. The Ethernet network interface module is configured to transmit and receive packets via an Ethernet connection. The processor is configured to process the packets transmitted and received by the Ethernet network interface module via the Ethernet connection. The processor is configured to support processing of the packets transmitted and received using (i) a hyper-text transfer protocol, (ii) a peer-to-peer sharing protocol, and (iii) an Internet small computer system interface (SCSI) protocol. The hard disk control module is configured to control, based on the packets transmitted and received, writing and reading of data to a hard disk drive. The hard disk control module, the processor, and the network interface module are located in an integrated circuit included in the hard disk drive.

15 Claims, 8 Drawing Sheets

Related U.S. Application Data continuation of application No. 13/245,269, filed on Sep. 26, 2011, now Pat. No. 8,161,215, which is a continuation of application No. 11/455,168, filed on Jun. 16, 2006, now Pat. No. 8,028,109.

(60) Provisional application No. 60/780,550, filed on Mar. 9, 2006.

(52) U.S. Cl.
CPC .............. *G06F 12/00* (2013.01); *G06F 3/0604* (2013.01); *G06F 3/0659* (2013.01)

(56) References Cited

U.S. PATENT DOCUMENTS

| | | | |
|---|---|---|---|
| 7,925,756 B1 * | 4/2011 | Riddle | 709/226 |
| 8,150,935 B2 * | 4/2012 | Mizrachi et al. | 709/212 |
| 2002/0152339 A1 | 10/2002 | Yamamoto | |
| 2003/0223142 A1 | 12/2003 | Mizuhiki et al. | |
| 2004/0023683 A1 | 2/2004 | Mizuhiki et al. | |
| 2004/0128627 A1 | 7/2004 | Zayas | |

FOREIGN PATENT DOCUMENTS

| | | |
|---|---|---|
| JP | 200451501 A | 5/2004 |
| JP | 2004213837 A | 7/2004 |
| JP | 2004362009 A | 12/2004 |
| WO | WO-2004061907 A2 | 7/2004 |

OTHER PUBLICATIONS

The International Search Report and Written Opinion of the International Searching Authority dated Aug. 24, 2007, for corresponding International Application No. PCT/US2007/005769; 11 pages.

802.3ab IEEE Std 802.3-2002 (Revision of IEEE Std 802.3-2000 Edition) IEEE Standard for Information Technology—Telecommunications and Information Exchange between systems—Local and Metropolitan area networks—Specific requirements Part 3: Carrier sense multiple access with collision detection (CSMA/CD) access method and physical layer specificaitons; Mar. 8, 2002; 104 Pages.

* cited by examiner

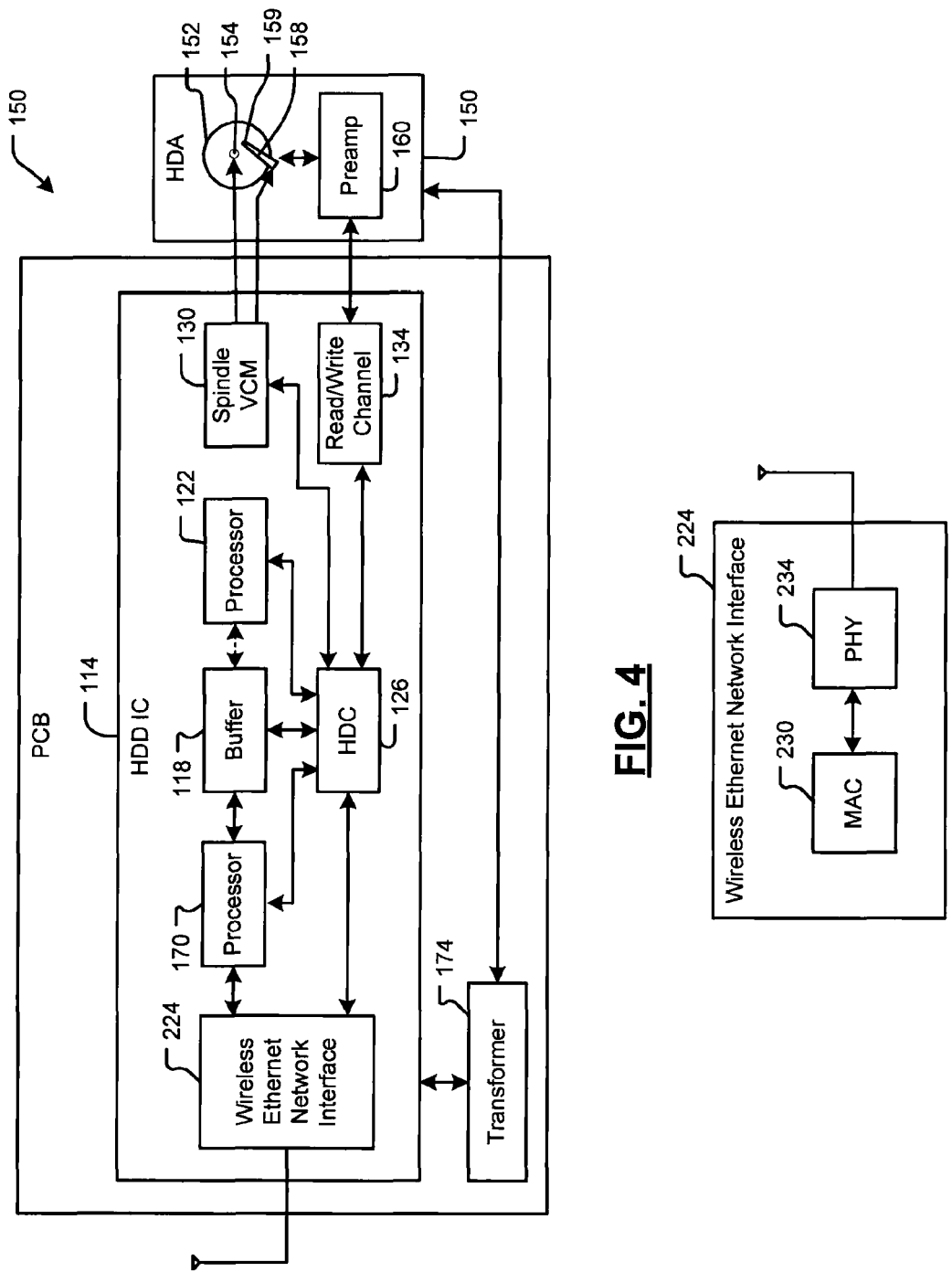

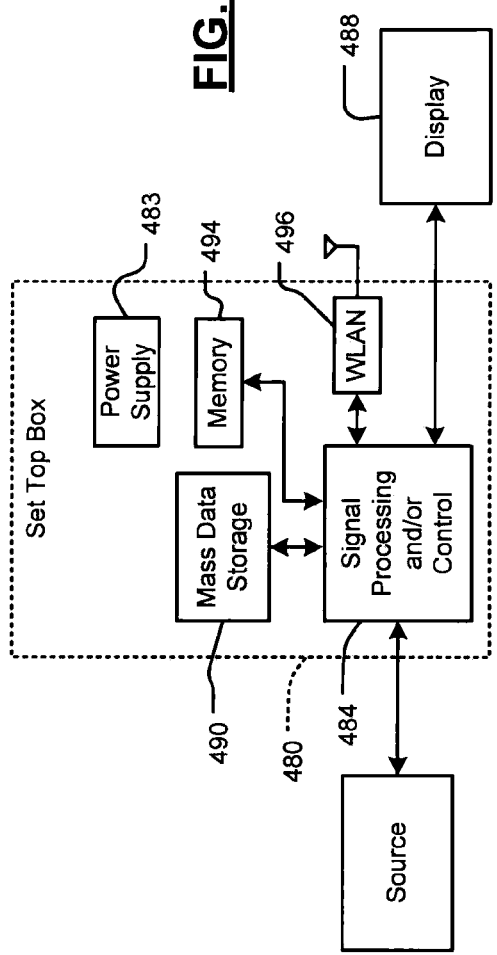
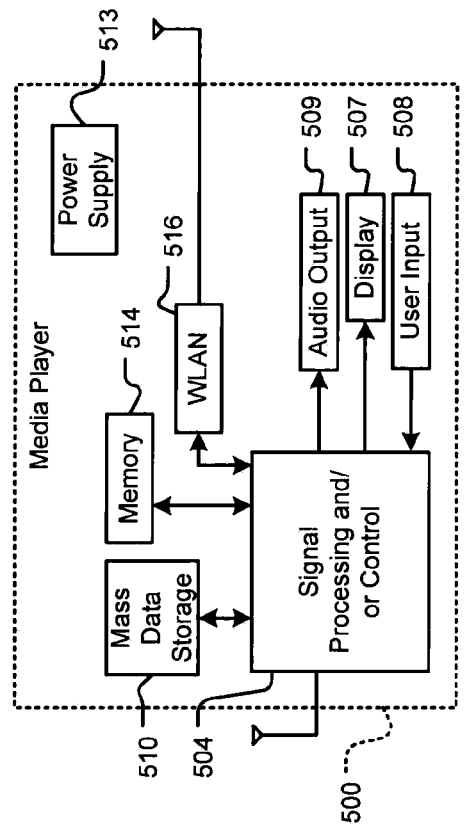

HARD DISK DRIVE WITH INTEGRATED ETHERNET NETWORK INTERFACE

CROSS-REFERENCE TO RELATED APPLICATIONS

The present disclosure is a continuation of U.S. patent application Ser. No. 13/681,885 (now U.S. Pat. No. 8,606,978), filed on Nov. 20, 2012 which is a continuation of U.S. patent application Ser. No. 13/447,486 (now U.S. Pat. No. 8,316,167), filed on Apr. 16, 2012, which is a continuation of U.S. patent application Ser. No. 13/245,269 (now U.S. Pat. No. 8,161,215), filed on Sep. 26, 2011, which is a continuation of U.S. patent application Ser. No. 11/455,168 (now U.S. Pat. No. 8,028,109), filed on Jun. 16, 2006, which claims the benefit of U.S. Provisional Application No. 60/780,550, filed on Mar. 9, 2006. The entire disclosures of the above referenced applications are incorporated herein by reference.

FIELD

The present disclosure relates to hard disk drives (HDDs), and more particularly to HDD integrated circuits (ICs).

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Electronic devices such as computers, laptops, personal video recorders (PVRs), MP3 players, game consoles, set-top boxes, digital cameras, and other electronic devices often need to store a large amount of data. Storage devices such as HDDs may be used to meet these storage requirements.

Referring now to FIG. 1, a HDD 10 includes a hard disk drive assembly (HDA) printed circuit board (PCB) 14. A buffer module 18 stores data that is associated with the control of the HDD 10. The buffer module 18 may employ SDRAM or other types of low latency memory. A processor 22 is arranged on the HDA PCB 14 and performs processing that is related to the operation of the HDD 10. A hard disk drive controller (HDC) module 26 communicates with an input/output interface module 24 and with a spindle/voice coil motor (VCM) driver module 30 and/or a read/write channel module 34. The input/output interface module can be a serial interface module, a parallel interface module, a serial Advance Technology Attachment (ATA) interface module, a parallel ATA interface module and/or other suitable interface module.

During write operations, the read/write channel module 34 encodes the data to be written by a read/write device 59, as described in detail hereinbelow. The read/write channel 34 processes the signal for reliability and may include, for example error correction coding (ECC), run length limited coding (RLL), and the like. During read operations, the read/write channel module 34 converts an analog output of the read/write device 59 to a digital signal. The converted signal is then detected and decoded by known techniques to recover the data written on the hard disk drive.

A hard drive assembly (HDA) 50 includes one or more hard drive platters 52 that include a magnetic coating that stores magnetic fields. The platters 52 are rotated by a spindle motor 54. Generally the spindle motor 54 rotates the hard drive platters 52 at a fixed speed during the read/write operations. One or more read/write arms 58 move relative to the platters 52 to read and/or write data to/from the hard drive platters 52. The spindle/VCM driver 30 controls the spindle motor 54, which rotates the platter 52. The spindle/VCM driver 30 also generates control signals that position the read/write arm 58 by using mechanisms such as a voice coil actuator, a stepper motor, or any other suitable actuator.

A read/write device 59 is located near a distal end of the read/write arm 58. The read/write device 59 includes a write element such as an inductor that generates a magnetic field. The read/write device 59 also includes a read element (such as a magneto-resistive (MR) element) that senses the magnetic field on the platter 52. The HDA 50 includes a preamp module 60, which amplifies analog read/write signals.

When reading data, the preamp module 60 amplifies low level signals from the read element and outputs the amplified signal to the read/write channel module 34. While writing data, a write current is generated that flows through the write element of the read/write device 59. The write current is switched to produce a magnetic field having a positive or negative polarity. The positive or negative polarity is stored by the hard drive platters 52 and is used to represent data.

SUMMARY

In general, in one aspect, this specification describes a system including a network interface module, a first processor, a hard disk control module, and a second processor. The network interface module is configured to communicate with a network. The first processor is configured to (i) communicate with the network interface module, and (ii) perform processing related to communication of a hard disk drive with the network via the network interface module. The hard disk control module is configured to (i) communicate with the first processor, and (ii) control operation of the hard disk drive. The second processor is configured to (i) communicate with the hard disk control module, and (ii) perform processing related to storing data on the hard disk drive. The second processor and the hard disk control module are configured to process packets communicated via the network interface module using a hyper-text transfer protocol, a peer-to-peer sharing protocol, and an Internet protocol-based small computer system interface standard.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a functional block diagram of another exemplary HDD according to the present disclosure;

FIG. 5 is a functional block diagram of an exemplary wired Ethernet network interface module for the HDD of FIG. 4;

FIG. 6C is a functional block diagram of a set top box; and

FIG. 6D is a functional block diagram of a media player.

DETAILED DESCRIPTION

Figure 1:
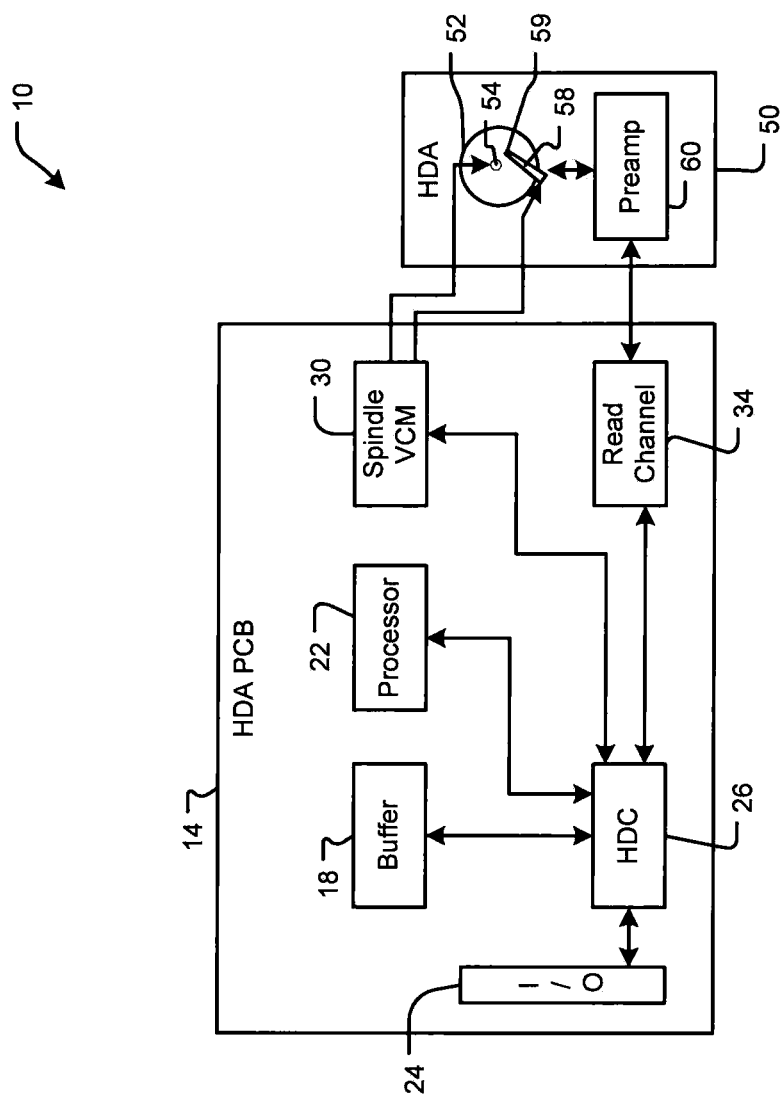
FIG. 1 is a functional block diagram of a hard disk drive (HDD) according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 2A:
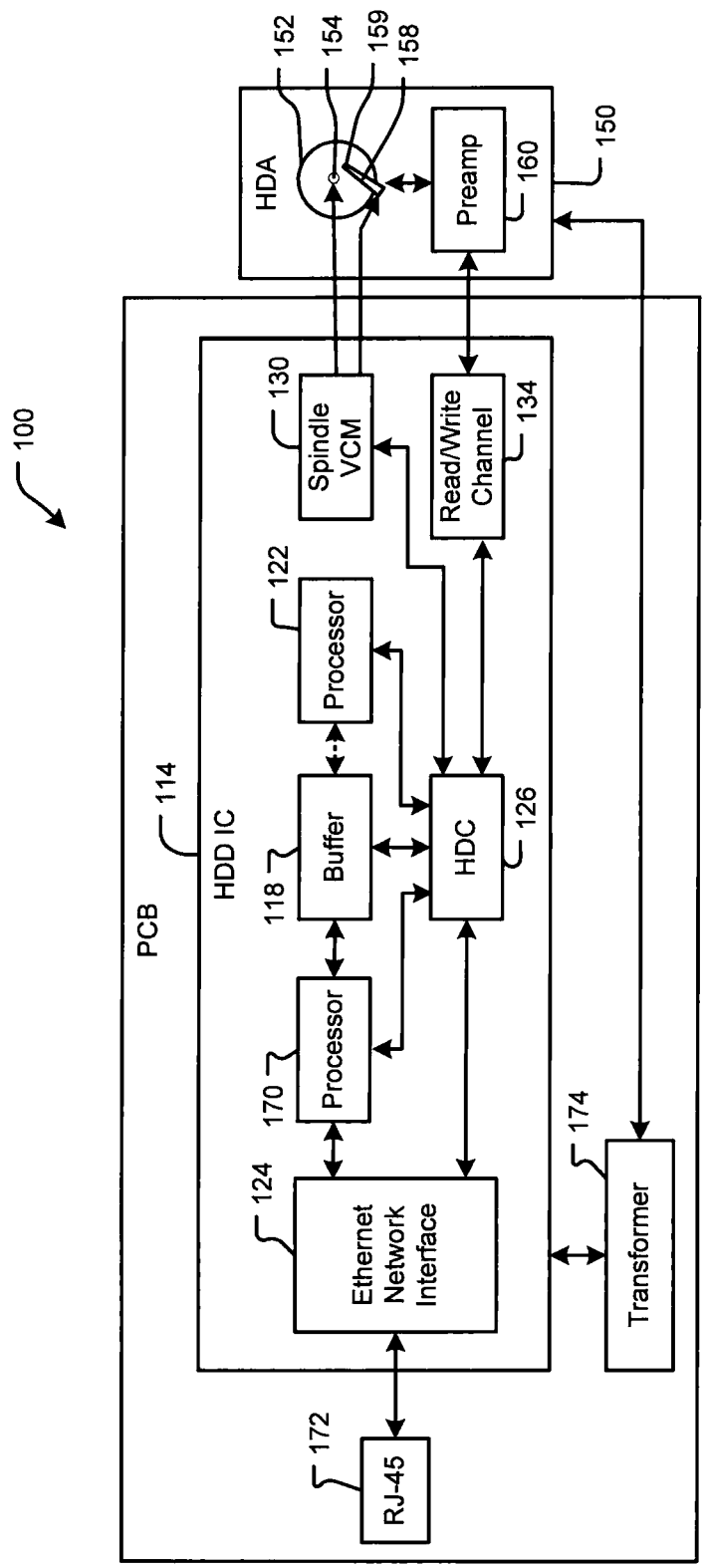
FIG. 2A is a functional block diagram of an exemplary HDD according to the present disclosure.

Referring now to FIG. 2A, an exemplary HDD 100 includes a HDD integrated circuit (IC) 114. The HDC IC 114 may be arranged on a printed circuit board (PCB) 115. The HDD IC 114 implements a buffer module 118, a processor 122, a wireline (i.e., wired) network interface module 124, and a hard disk drive controller (HDC) module 126. The HDC module 126 communicates with the wireline network interface module 124, a spindle/voice coil motor (VCM) driver module 130, and/or a read/write channel module 134.

The wireline network interface module 124 sends and receives packets on a medium as will be described further below. The read/write channel module 134 encodes the write data to be written and decodes read data. By integrating the wireline network interface module 124 with other HDD components on the HDD IC 114, cost and size of the HDD 100 tends to decrease and performance tends to increase.

A hard disk drive assembly (HDA) 150 includes one or more hard drive platters 152 that are rotated by a spindle motor 154. One or more read/write arms 158 move relative to the platters 152 to read and/or write data to/from the hard drive platters 152. The spindle/VCM driver module 130 controls the spindle motor 154, which rotates the platter 152. The spindle/VCM driver module 130 also generates control signals that position the read/write arm 158 by using mechanisms such as a voice coil actuator, a stepper motor, or any other suitable actuator.

A read/write device 159 is located near a distal end of the read/write arm 158. The read/write device 159 includes a write element such as an inductor that generates a magnetic field. The read/write device 159 also includes a read element (such as a magneto-resistive (MR) element) that senses the magnetic field on the platter 152. The HDA 150 includes a preamp module 160, which amplifies analog read/write signals.

The wireline network interface module 124 and/or the processor 170 may also support encryption/decryption. An RJ-45 connector 172 may be provided to connect CAT5, CAT6 and/or other suitable cable to the wireline network interface module 124. The wireline network interface module 124 can be Ethernet compliant and can operate at speeds greater than or equal to 1 Gigabit per second.

A transformer 174 may likewise be provided to provide suitable supply voltage and current from a power source such as a battery and/or AC supply. Alternately, the HDD 100 can operate using power delivered over the cable. In other words, the HDD 100 can operate as a power-over-Ethernet device.

The processor 122 and/or a second processor 170 may be provided to perform functions related to the receipt and processing of the packets received from and/or sent to the wireline network interface module 124. For example, the processors 122 and/or 170 may support http server functionality. The processors 122 and/or 170 may support a peer-to-peer sharing protocol server such as BitTorrent.

The processors 122 and/or 170 may support Internet Small Computer System Interface module (iSCSI). iSCSI is an Internet Protocol (IP)-based storage networking standard for linking data storage facilities. By carrying SCSI commands over IP networks, iSCSI is used to facilitate data transfers over intranets and to manage storage over long distances.

When an end user or application sends a request, the operating system generates the appropriate SCSI commands and data request, which then go through encapsulation and, if necessary, encryption procedures. A packet header is added before the resulting IP packets are transmitted over an Ethernet connection.

When a packet is received, it is decrypted (if it is encrypted before transmission), and disassembled, separating the SCSI commands and request. The SCSI commands are sent on to the SCSI controller, which can be implemented by the HDC module 126, the processor 122 and/or the processor 170, and from there to the SCSI storage device. Because iSCSI is bi-directional, the protocol can also be used to return data in response to the original request.

The peer-to-peer sharing protocol server such as BitTorrent is a content distribution protocol that enables efficient software distribution and peer-to-peer sharing of very large files by enabling users to serve as network redistribution points. Rather than having to send a download to each customer individually, the content is sent to one customer who shares it with other customers. Together the customers share the pieces of the download back and forth until everyone has the complete download.

Figure 2B:
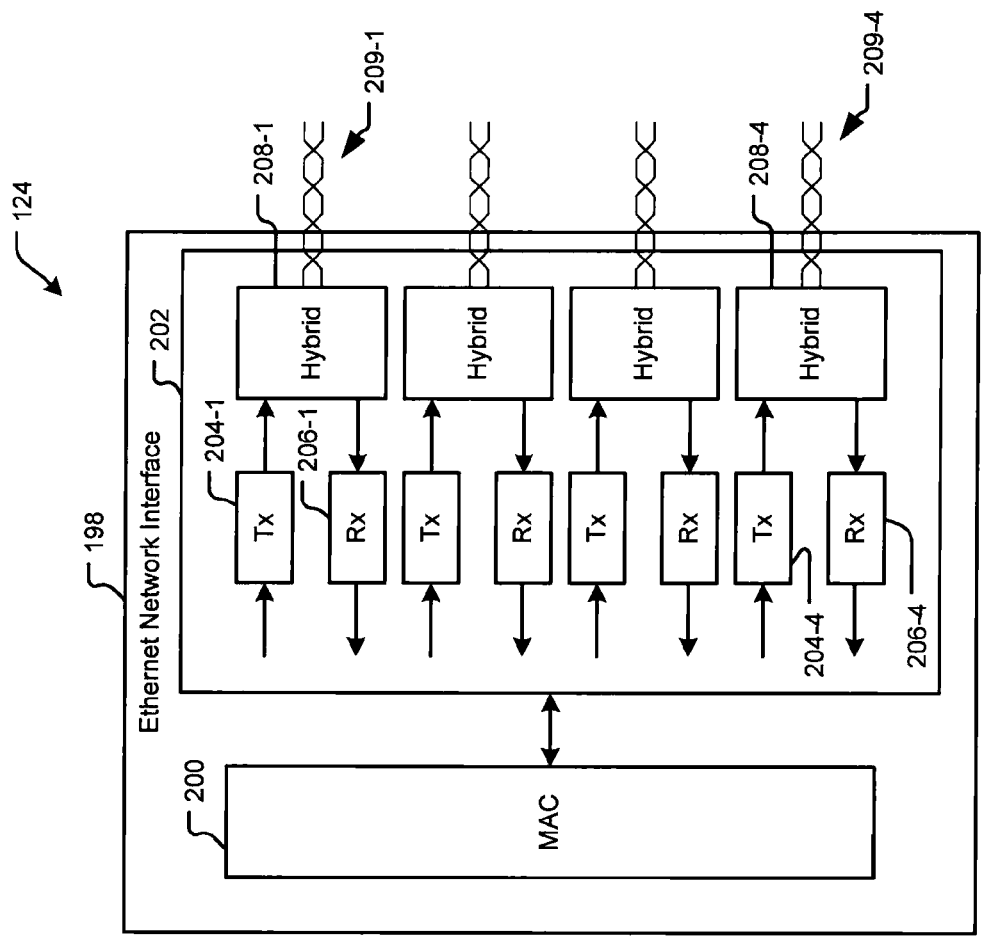
FIG. 2B is a functional block diagram of an exemplary wired Ethernet network interface module for the HDD of FIG. 2A.

Referring now to FIG. 2B, an exemplary wireline network interface module 124 for the hard disk drive 100 of FIG. 2A is shown. The wireline network interface module 124 can be compliant with IEEE section 802.3ab. The wireline network interface module 124 may include a Gigabit Ethernet network device 198 that operates at speeds greater than or equal to 1 Gb/s and/or 10 Gb/s. The Gigabit Ethernet network device 198 includes a medium access control (MAC) module 200 and a physical layer (PHY) module 202. The PHY module 202 includes transmitters 204-1, 204-2, . . . and 204-4 (collectively transmitters 204) and receivers 206-1, 206-2, . . . and 206-4 (collectively receivers 206). Each of the transmitters 204 and receivers 206 may be implemented by transceivers (not shown).

Transmitters 204 and receivers 206 communicate with hybrids 208-1, 208-2, . . . and 208-4 (collectively hybrids 208). Specifically, a transmitter 204-1 and a receiver 206-1 communicate with a hybrid 208-1. A transmitter 204-2 and a receiver 206-2 communicate with a hybrid 208-2, etc. The hybrids 208, in turn, communicate with twisted wire pairs of a cable 209-1, . . . , and 209-4 (collectively cable 209). An RJ-45 connector 172 may be provided to connect CAT5, CAT6 and/or other suitable cable to the wireline network interface module 124.

Figure 3A:
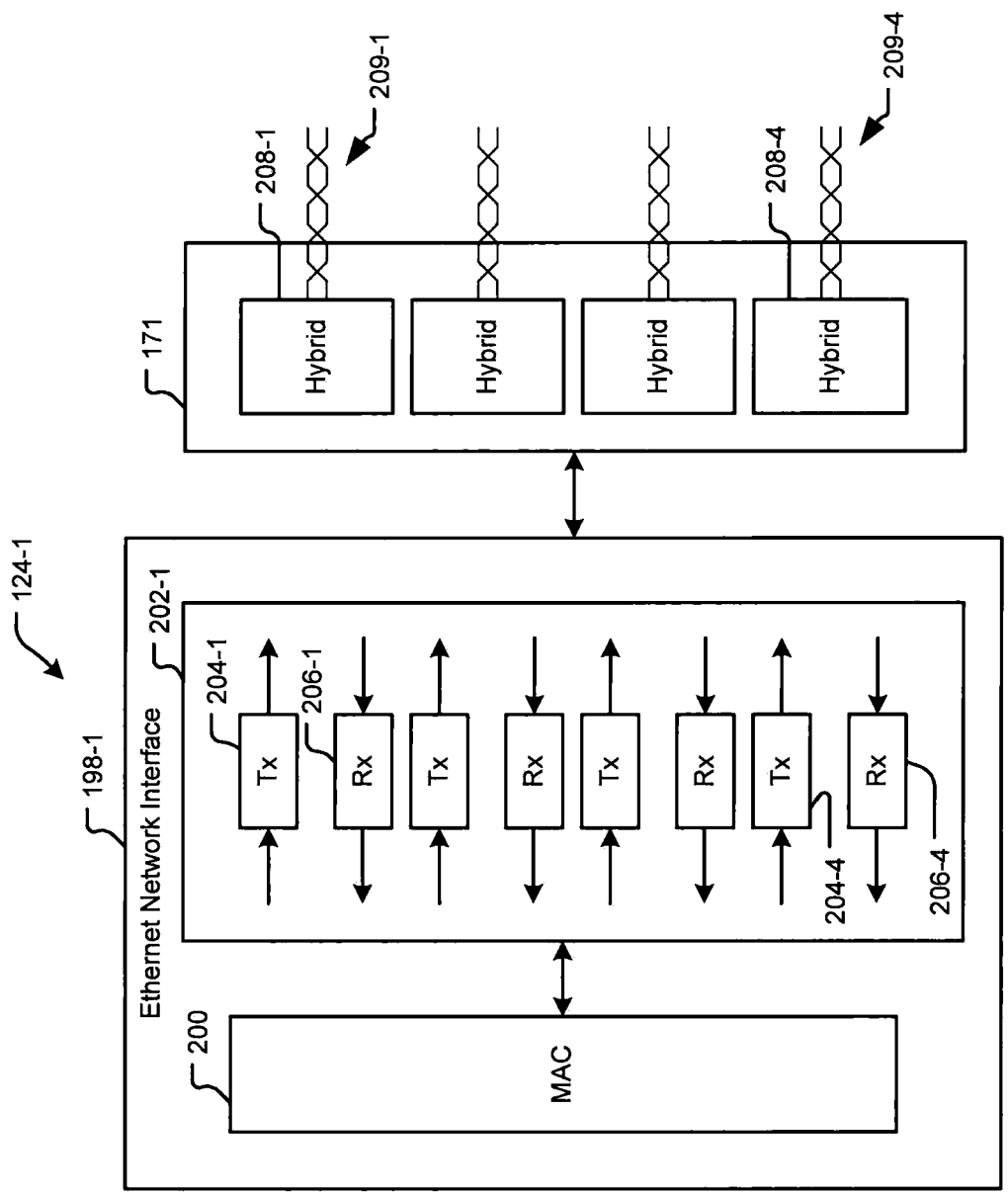
FIG. 3A is a functional block diagram of an exemplary wired Ethernet network interface module according to the present disclosure.
Figure 3B:
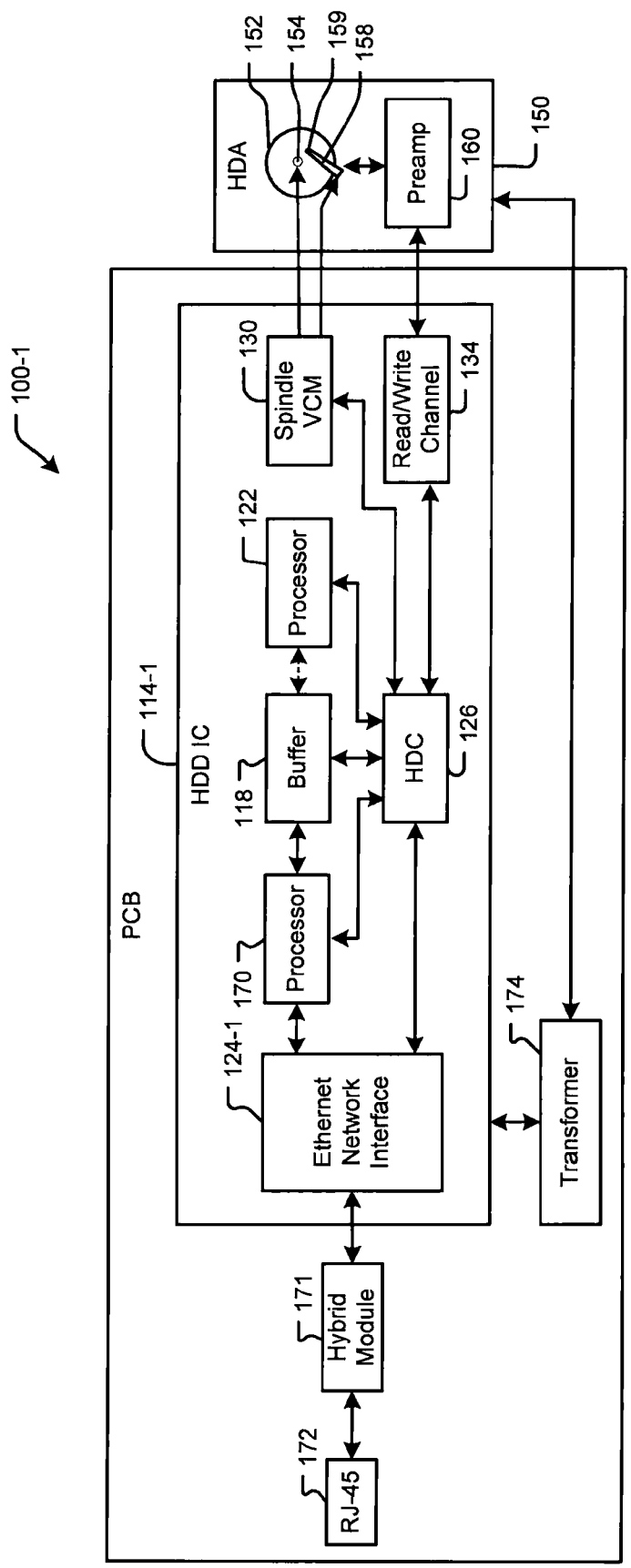
FIG. 3B is a functional block diagram of an exemplary HDD comprising the wired Ethernet network interface module of FIG. 3A.

In some implementations, the hybrids 208 may be implemented separately from (i.e., external to) the wireline network interface module 124. Referring now to FIGS. 3A-3B, an exemplary wireline network interface module 124-1 for the hard disk drive 100-1 of FIG. 3B is shown. The wireline network interface module 124-1 does not include the hybrids 208. Instead, a hybrid module 171, which is separate and apart from the wireline network interface module 124-1, includes the hybrids 208.

The wireline network interface module 124-1 can be compliant with IEEE section 802.3ab. The wireline network interface module 124-1 may include a Gigabit Ethernet network device 198-1 that operates at speeds greater than or equal to 1 Gb/s and/or 10 Gb/s. The Gigabit Ethernet network device 198-1 includes a medium access control (MAC) module 200 and a physical layer (PHY) module 202. The PHY module 202 includes transmitters 204-1, 204-2, . . . and 204-4 (collectively transmitters 204) and receivers 206-1, 206-2, . . . and 206-4 (collectively receivers 206). Each of the transmitters 204 and receivers 206 may be implemented by transceivers (not shown).

The hybrid module 171 comprises hybrids 208-1, 208-2, . . . and 208-4 (collectively hybrids 208). The wireline network interface module 124-1 communicates with the hybrid module 171. That is, transmitters 204 and receivers 206 communicate with hybrids 208. Specifically, a transmitter 204-1 and a receiver 206-1 communicate with a hybrid 208-1. A transmitter 204-2 and a receiver 206-2 communicate with a hybrid 208-2, etc. The hybrids 208, in turn, communicate with twisted wire pairs of a cable 209-1, . . . , and 209-4 (collectively cable 209). An RJ-45 connector 172 may be provided to connect CAT5, CAT6 and/or other suitable cable to the hybrid module 171.

Referring now to FIGS. 4 and 5, another exemplary HDD 150 according to the present disclosure is shown to include an integrated wireless network interface module 224 that sends and receives packets wirelessly. In FIG. 5, a functional block diagram of an exemplary integrated wireless network interface module 224 for the HDD 150 of FIG. 4 is shown.

The integrated wireless network interface module 224 includes a physical layer (PHY) module 234, which provides an interface module to the wireless medium via one or more antennas. A medium access control (MAC) module 230 provides an interface module between the PHY module 234 and a host. In this case, the host is the processor 122 and/or 170 and/or the HDC module 126 of the HDD 150.

Figure 6B:
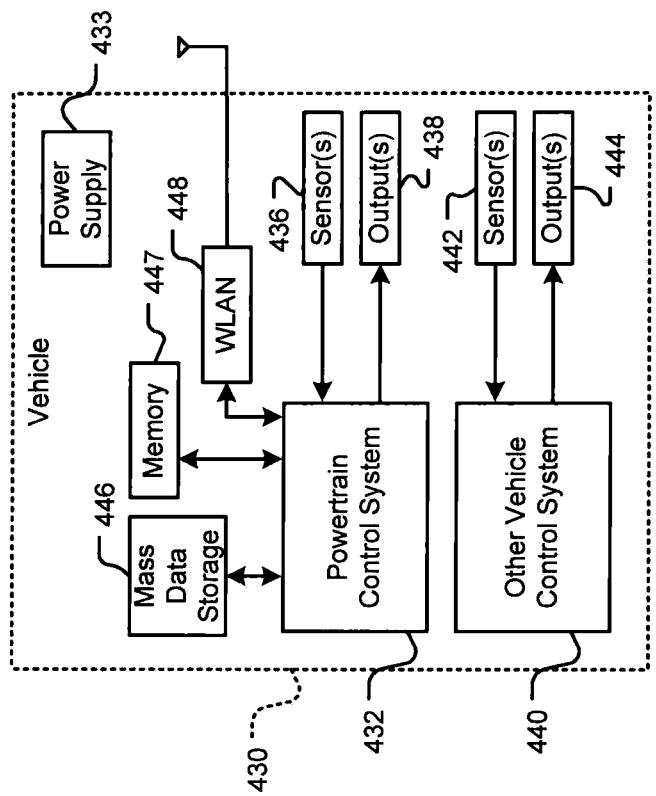
FIG. 6B is a functional block diagram of a vehicle control system.
Figure 6A:
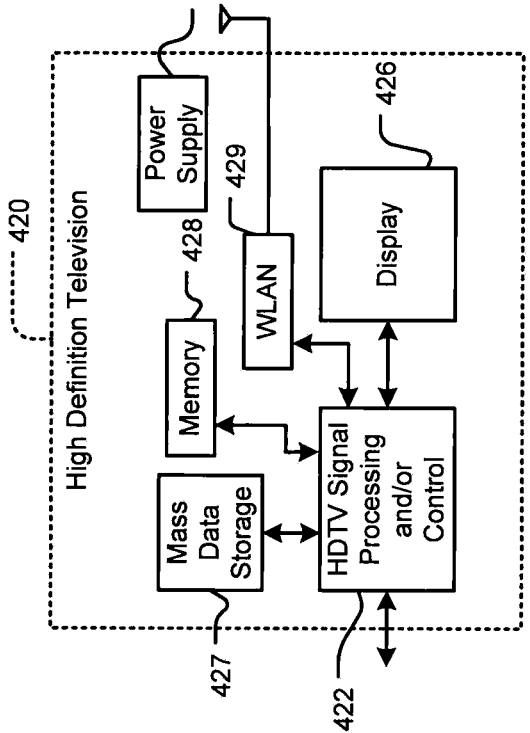
FIG. 6A is a functional block diagram of a high definition television.

Referring now to FIGS. 6A-6D various exemplary implementations of the present disclosure are shown. HDD 100, HDD 100-1, and HDD 150 are hereinafter collectively referred to as HDD 100s. Referring now to FIG. 6A, the HDD 100s can be implemented in mass data storage 427 of a high definition television (HDTV) 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as the HDD 100s. The HDD 100s may include a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface module 429.

Referring now to FIG. 6B, the HDD 100s may be implemented in mass data storage of a vehicle control system. In some implementations, a powertrain control system 432 receives inputs from one or more sensors. The sensors may include temperature sensors, pressure sensors, rotational sensors, airflow sensors and/or any other suitable sensors. The powertrain control system 432 may generate one or more output control signals such as engine operating parameters, transmission operating parameters, and/or other control signals.

The HDD 100s may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include the hard disk drives HDD 100s. The HDD 100s may include a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface module 448. The control system 440 may also include mass data storage, memory and/or a WLAN interface module (all not shown).

Referring now to FIG. 6C, the HDD 100s can be implemented in mass data storage 490 of a set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include the HDD 100s. The HDD 100s may include a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface module 496.

Referring now to FIG. 6D, the HDD 100s can be implemented in mass data storage 510 of a media player 500. In some implementations, the media player 500 includes a display 507 and/or a user input 508 such as a keypad, touchpad and the like. In some implementations, the media player 500 may employ a graphical user interface module (GUI) that typically employs menus, drop down menus, icons and/or a point-and-click interface module via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include the HDD 100s. The HDD 100s may include a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface module 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
   an Ethernet network interface module configured to transmit and receive packets via an Ethernet connection;
   a processor configured to
      process the packets transmitted and received by the Ethernet network interface module via the Ethernet connection,
      wherein the processor is configured to support processing of the packets transmitted and received using (i) a hyper-text transfer protocol, (ii) a peer-to-peer sharing protocol, and (iii) an Internet small computer system interface (SCSI) protocol; and
   a hard disk control module configured to control, based on the packets transmitted and received, writing and reading of data to a hard disk drive,
   wherein the hard disk control module, the processor, and the network interface module are located in an integrated circuit included in the hard disk drive.

2. The system of claim 1, wherein each of the packets includes (i) a packet header, and (ii) at least one of a SCSI command and a SCSI data request.

3. The system of claim 1, wherein the Ethernet network interface module is configured to perform encryption and decryption of the packets.

4. The system of claim 1, wherein the Ethernet network interface module is compliant with IEEE 802.3ab protocol.

5. The system of claim 1, wherein the Ethernet network interface module comprises:
   a media access control (MAC) module configured to communicate with the processor; and
   a physical layer (PHY) module configured to communicate with the MAC module and the Ethernet connection, the PHY module comprising:
      a plurality of hybrids configured to communicate with the Ethernet connection via respective cables; and
      a plurality of transceivers configured to communicate with respective ones of the plurality of hybrids.

6. The system of claim 1, wherein the integrated circuit is configured to receive power via the Ethernet connection.

7. A printed circuit board, comprising:
   the system of claim 1; and
   a connector configured to connect the Ethernet network interface module with the Ethernet connection.

8. The printed circuit board of claim 7, wherein the connector includes an RJ-45 connector.

9. A method comprising:
   using an integrated circuit configured to support processing of packets transmitted and received using (i) a hyper-text transfer protocol, (ii) a peer-to-peer sharing protocol, and (iii) an Internet small computer system interface (SCSI) protocol, wherein the integrated circuit is included in a hard disk drive,
   transmitting and receiving packets via an Ethernet connection;
   processing the packets transmitted and received via the Ethernet connection; and
   controlling, based on the packets transmitted and received, writing and reading of data to the hard disk drive.

10. The method of claim 9, wherein each of the packets includes (i) a packet header, and ii) at least one of a SCSI command and a SCSI data request.

11. The method of claim 9, further comprising, using the integrated circuit, performing encryption and decryption of the packets.

12. The method of claim 9, wherein the transmitting and the receiving are compliant with IEEE 802.3ab protocol.

13. The method of claim 9, further comprising receiving power via the Ethernet connection.

14. The method of claim 9, further comprising arranging, on a printed circuit board, (i) the integrated circuit, and (ii) a connector configured to connect the integrated circuit with the Ethernet connection.

15. The method of claim 14, wherein the connector includes an RJ-45 connector.

* * * * *